US012083466B2

(12) United States Patent
Roth et al.

(10) Patent No.: US 12,083,466 B2
(45) Date of Patent: Sep. 10, 2024

(54) FILTER CARTRIDGE WITH TURBULENCE GENERATING FEATURES

(71) Applicant: USA as represented by the Secretary of the Army, Washington, DC (US)

(72) Inventors: Marc L. Roth, Owens Cross Roads, AL (US); William J Spangler, Jr., Forest Hill, MI (US); Lester D Strauch, III, Churchville, MD (US); Patrick O Hulbert, Dallastown, PA (US); Robert Michael Ferguson, Baytown, TX (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 743 days.

(21) Appl. No.: 17/237,247

(22) Filed: Apr. 22, 2021

(65) Prior Publication Data

US 2021/0331110 A1     Oct. 28, 2021

Related U.S. Application Data

(60) Provisional application No. 63/014,264, filed on Apr. 23, 2020.

(51) Int. Cl.
*B01D 46/00* (2022.01)
*A62B 23/02* (2006.01)
(Continued)

(52) U.S. Cl.
CPC .......... *B01D 46/0045* (2013.01); *A62B 23/02* (2013.01); *B01D 46/0004* (2013.01);
(Continued)

(58) Field of Classification Search
CPC .. B01D 46/0002–0005; B01D 46/0045; B01D 46/10; B01D 46/0041;
(Continued)

(56) References Cited

U.S. PATENT DOCUMENTS

| 5,390,668 A | * | 2/1995 | Lehman | ............. B01D 46/0028 |
| | | | | 96/108 |
| 5,647,356 A | * | 7/1997 | Osendorf | ............... A62B 27/00 |
| | | | | 128/206.17 |

(Continued)

FOREIGN PATENT DOCUMENTS

| CN | 1225033 A | * | 8/1999 | .......... A61M 16/105 |
| WO | WO-2012064152 A2 | * | 5/2012 | ............. A41D 13/11 |

OTHER PUBLICATIONS

CN-1225033-A description translation accessed Feb. 8, 2024 (Year: 2024).*

*Primary Examiner* — Samchuan C Yao
*Assistant Examiner* — Kira B Daher
(74) *Attorney, Agent, or Firm* — Karen G. Hazzah

(57) ABSTRACT

The present disclosure provides a filter cartridge for a facepiece respirator mask body. The filter cartridge includes a cover, a base, and a filter medium. The cover has a top surface, a cover sidewall, cover support elements, and an inhalation vent. The cover support elements extend downwardly from the top surface. The inhalation vent is located at least primarily in the cover sidewall. The base has a bottom surface, a base sidewall, base support elements, and an inhalation port. The base support elements extend upwardly from the bottom surface. The inhalation port is located in the bottom surface. The base and the cover collectively define an interior compartment. The filter medium is sandwiched between the base support elements and the cover support elements in a manner that divides the
(Continued)

interior compartment into an upper chamber and a lower chamber.

18 Claims, 12 Drawing Sheets

(51) Int. Cl.
    *B01D 46/10*           (2006.01)
    *A62B 19/00*          (2006.01)

(52) U.S. Cl.
    CPC ......... *B01D 46/0005* (2013.01); *B01D 46/10* (2013.01); *A62B 19/00* (2013.01); *B01D 2265/028* (2013.01); *B01D 2279/65* (2013.01)

(58) Field of Classification Search
    CPC .......... B01D 46/2411; B01D 2265/028; B01D 2279/65; A62B 23/00–02; A62B 18/02; A62B 18/025; A62B 18/08; A62B 18/088; A62B 19/00; A62B 7/10; A61M 16/105–107
    See application file for complete search history.

(56) References Cited

U.S. PATENT DOCUMENTS

| | | | | |
|---|---|---|---|---|
| 6,106,244 | A * | 8/2000 | Nakatsukasa | B01D 29/606 |
| | | | | 417/313 |
| 6,328,442 | B1 * | 12/2001 | Brinkly | B41J 29/10 |
| | | | | 347/104 |
| 9,750,960 | B2 * | 9/2017 | Fleming | A62B 19/00 |
| 2014/0216479 | A1 * | 8/2014 | Jeong | A41D 13/1138 |
| | | | | 128/863 |

* cited by examiner

FILTER CARTRIDGE WITH TURBULENCE GENERATING FEATURES

CROSS REFERENCE TO RELATED APPLICATIONS

This application claims the benefit of U.S. Provisional Application No. 63/014,264, filed on Apr. 23, 2020, which is incorporated by reference herein in its entirety.

FIELD

The present disclosure generally relates to a filter cartridge, and more specifically, to a filter cartridge for a facepiece respirator mask body.

BACKGROUND

Facepiece respirators are worn over the mouth and/or nose of a person to prevent impurities or contaminants from entering the person's breathing passages. Such respirators are commonly used in an environment where the ambient air contains particles that are harmful to the wearer, for example, in an auto body shop or in a hospital. Facepiece respirators should not make breathing difficult for the wearer and should allow the wearer to inhale and exhale comfortably while using the respirator.

Facepiece respirators typically include a mask body and one or more filter cartridges that are attached to the mask body. The mask body is worn on the face of a person over the mouth and/or nose and may include additional portions that cover the head, neck, or other body parts. The mask body adequately seals against the face of the person to prevent unfiltered air from entering the interior of the mask body. Ambient air is drawn through the filter cartridge by a negative pressure generated by inhalation from a person wearing the facepiece respirator. The ambient air passes through a filter medium positioned within the filter cartridge, thereby resulting in filtered air. The filtered air subsequently enters the interior of the mask body so that it can be safely inhaled by the wearer. The wearer can then exhale air from the interior of the mask body through an exhalation port.

The filter cartridges are commonly connected to an inlet port of the mask body via a threaded engagement, a bayonet engagement, or some other type of engagement. In the case of a dual cartridge facepiece respirator, the filter cartridges are often connected to air inlets located proximate each cheek region of the mask body away from a central region. As seen in FIG. 1, the filter cartridges extend outward at sides of the wearer's head. Inhalation check valves are commonly provided for each air inlet, such that air may be delivered from the filter cartridge into the interior of the mask body adjacent each cheek region.

Current filter cartridges have several shortcomings. For example, some filter cartridges fail to properly support the filter medium. Other filter cartridges fail to adequately distribute incoming ambient air across an entirety of the filter medium. Either situation can result in ambient air not being properly filtered and/or decreased breathability through the filter cartridge. Yet other filter cartridges are heavy and bulky, resulting in wearer discomfort and, in some instances, decreased visibility.

Accordingly, it is seen that a need remains for an improved filter cartridge addressing these shortcomings.

BRIEF SUMMARY

In one embodiment, the present disclosure provides a filter cartridge for a facepiece respirator. The filter cartridge includes a cover, a base, and a filter medium. The cover has a top surface, a cover sidewall, a plurality of cover support elements, and an inhalation vent. The cover support elements extend downwardly from the top surface. The inhalation vent is located at least primarily in the cover sidewall. The base has a bottom surface, a base sidewall, a plurality of base support elements, and an inhalation port. The base support elements extend upwardly from the bottom surface. The inhalation port extends through the bottom surface. The base and the cover collectively define an interior compartment. The filter medium is sandwiched between the base support elements and the cover support elements in a manner that divides the interior compartment into an upper chamber and a lower chamber. The filter cartridge is configured such that ambient air entering into the upper chamber via the inhalation vent passes through the filter medium and into the lower chamber before exiting the interior compartment through the inhalation port.

BRIEF DESCRIPTION OF THE DRAWINGS

For a better understanding of the nature and objects of the disclosure, reference should be made to the following detailed description taken in conjunction with the accompanying drawings, in which.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Figure 1:
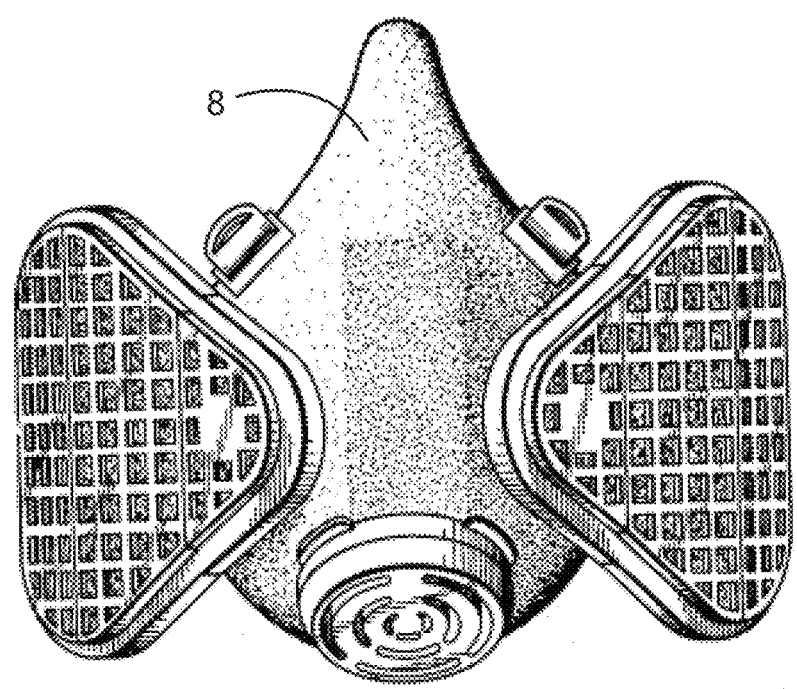
FIG. 1 is an image of a prior art facepiece respirator, the respirator including a mask body and two filter cartridges.
Figure 2A:
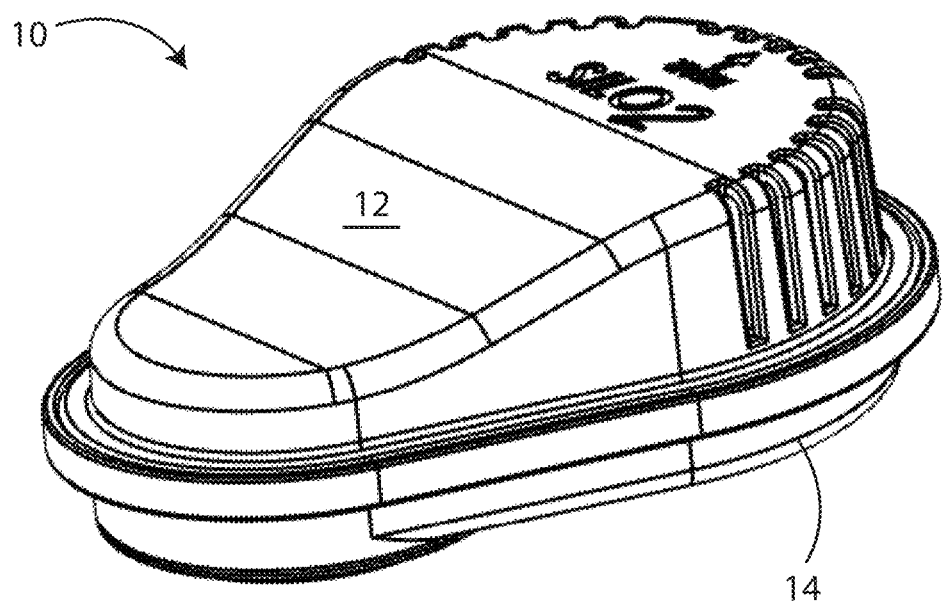
FIG. 2A is a front perspective view of a filter cartridge in accordance with the present disclosure.
Figure 2B:
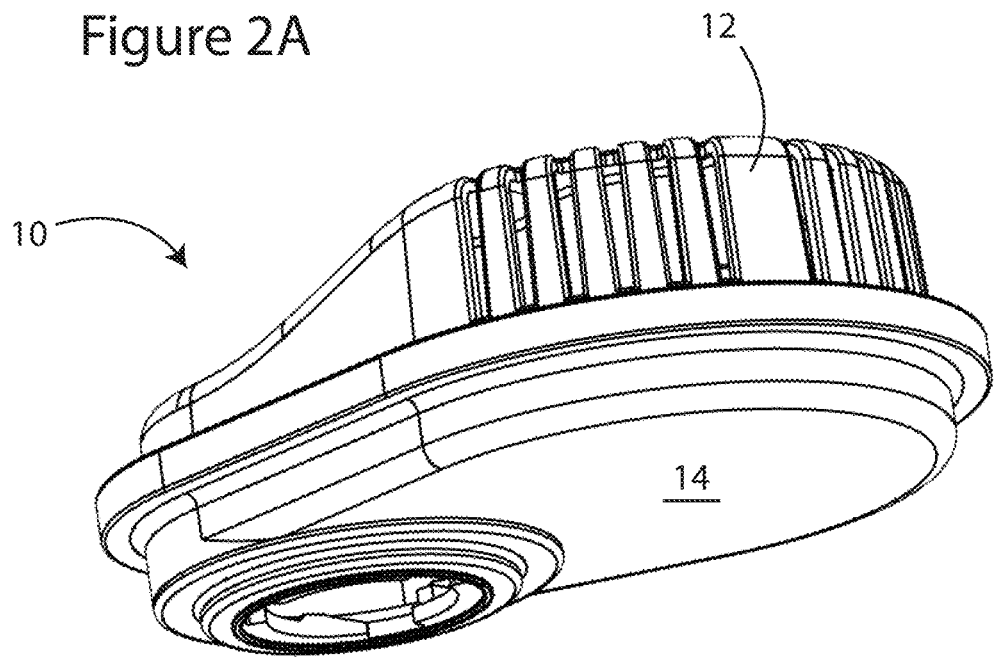
FIG. 2B is a rear perspective view of the filter cartridge shown in FIG. 2A.
Figure 3:
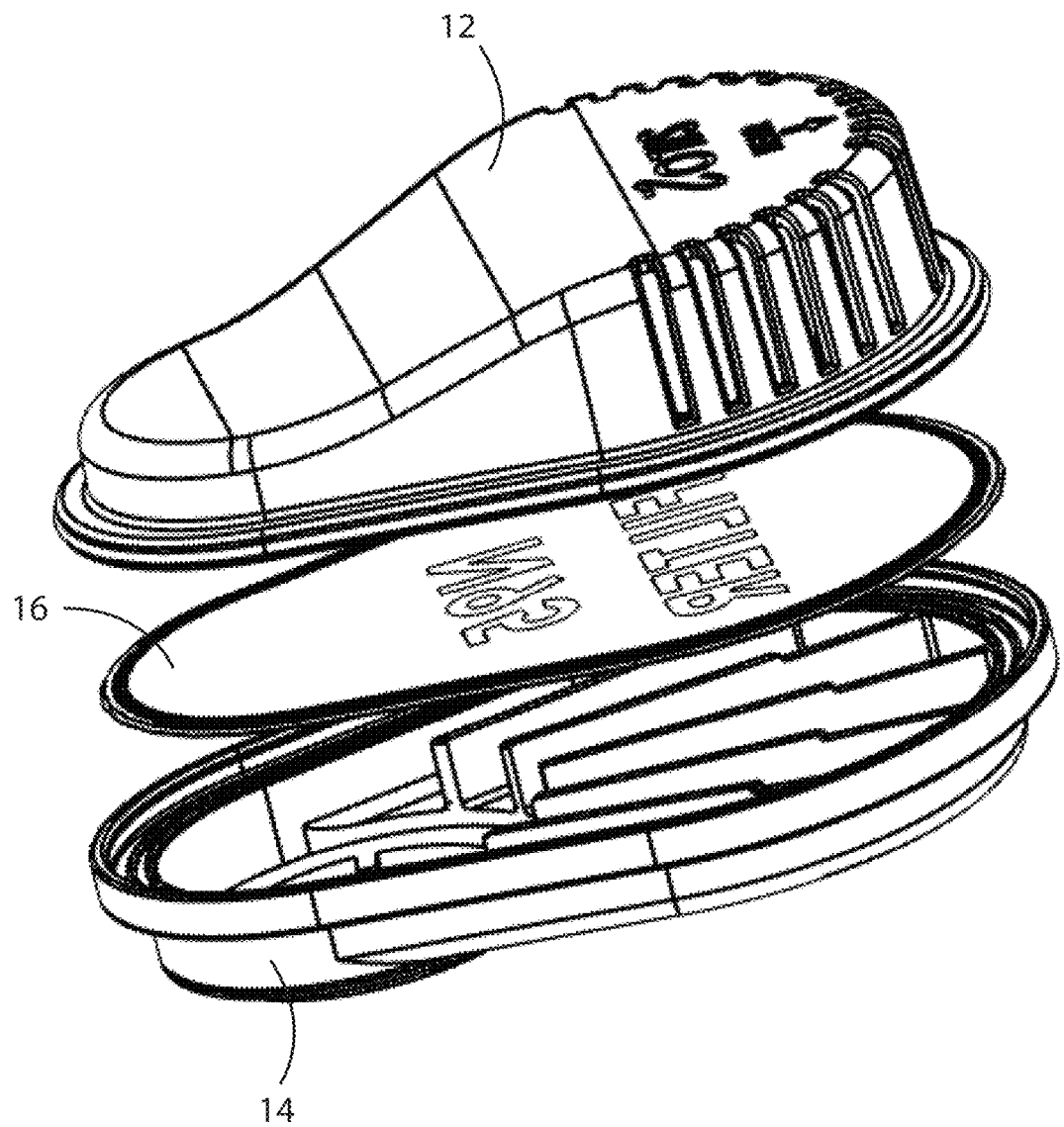
FIG. 3 is an exploded view of the filter cartridge shown in FIGS. 2A-2B.

The present disclosure generally relates to a filter cartridge 10 for a facepiece respirator mask body 8 (as shown in the prior art reference in FIG. 1). The filter cartridge 10 may be used, for example, with a full or half facepiece respirator mask body having two cartridges. One commercially available half facepiece respirator is the 3M® Half Facepiece Reusable Respirator Series 6200. The filter cartridge 10 may be used in conjunction with the facepiece respirator mask body 8 to filter ambient air before the air enters into the interior of the mask body so that it can be safely inhaled by the wearer.

Figure 4:
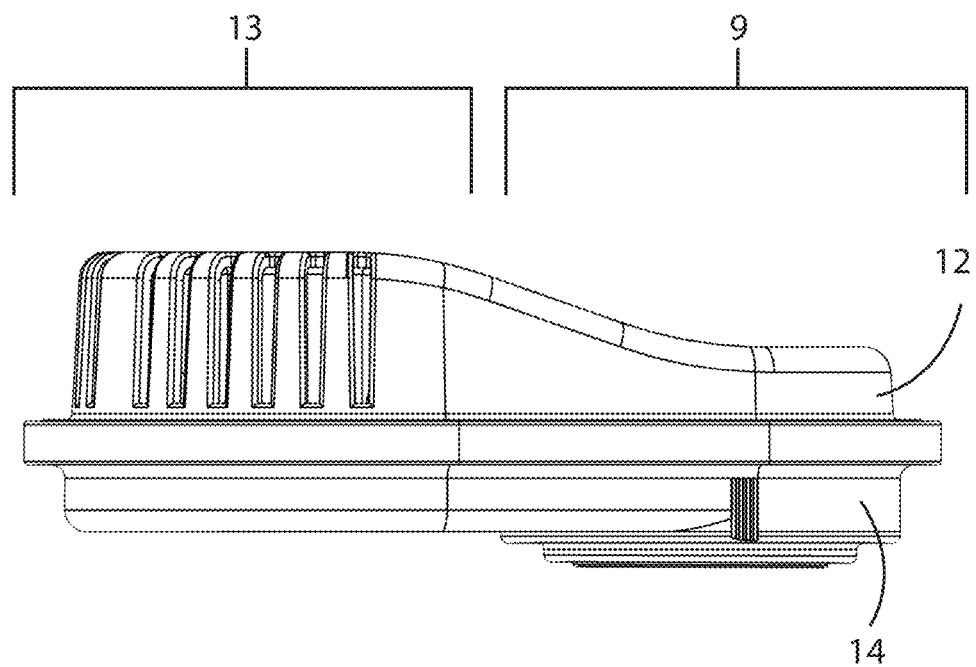
FIG. 4 is a side view of the filter cartridge shown in FIGS. 2A-2B.

As seen in FIGS. 2A-2B, FIG. 3, and FIG. 4, the filter cartridge 10 has a cover 12, a base 14, and a filter medium 16. The filter medium 16 may vary depending upon the environment of the ambient air. For example, one type of filter medium may be used in environments associated with the oil and gas industry while another type of filter medium may be used in environments associated with the medical industry. Varying types of filter medium can be used with the filter cartridge 10 of the present disclosure. As shown in FIG. 4, the filter cartridge 10 can be divided into two general regions: a front region 9 and a rear region 13.

Figure 5:
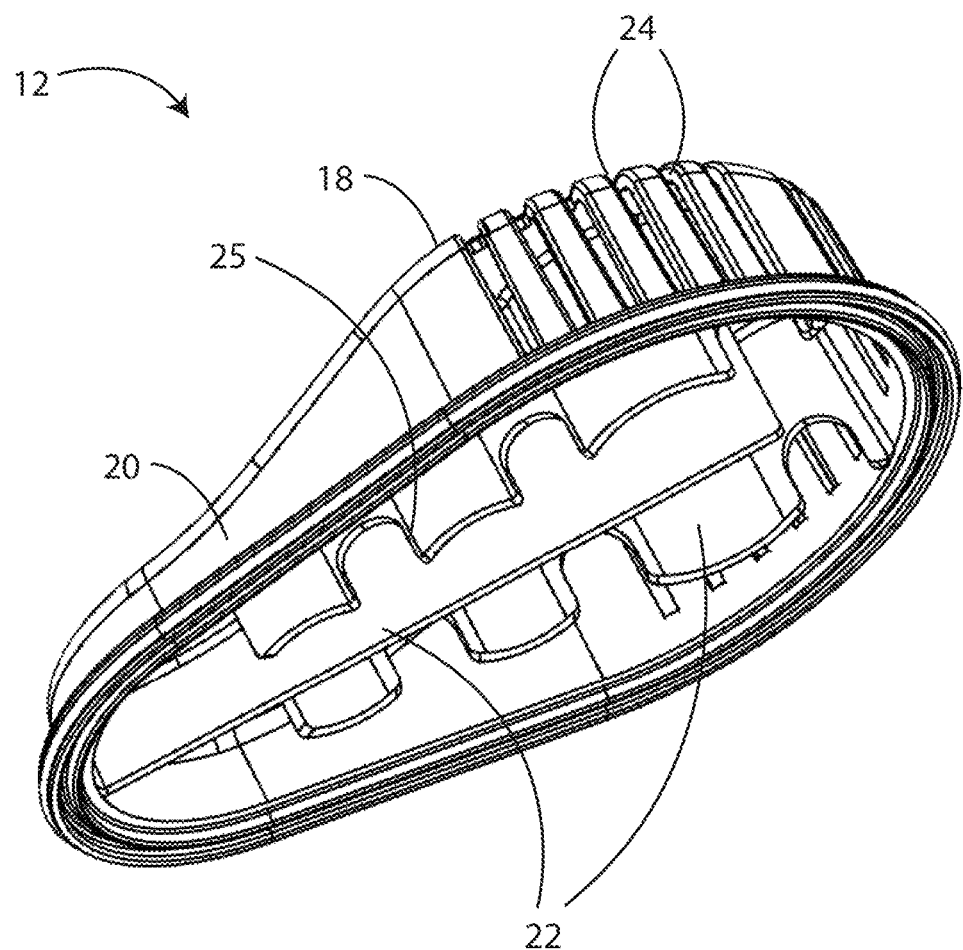
FIG. 5 is a bottom perspective view of a cover of the filter cartridge shown in FIGS. 2A-2B, FIG. 3, and FIG. 4.
Figure 6:
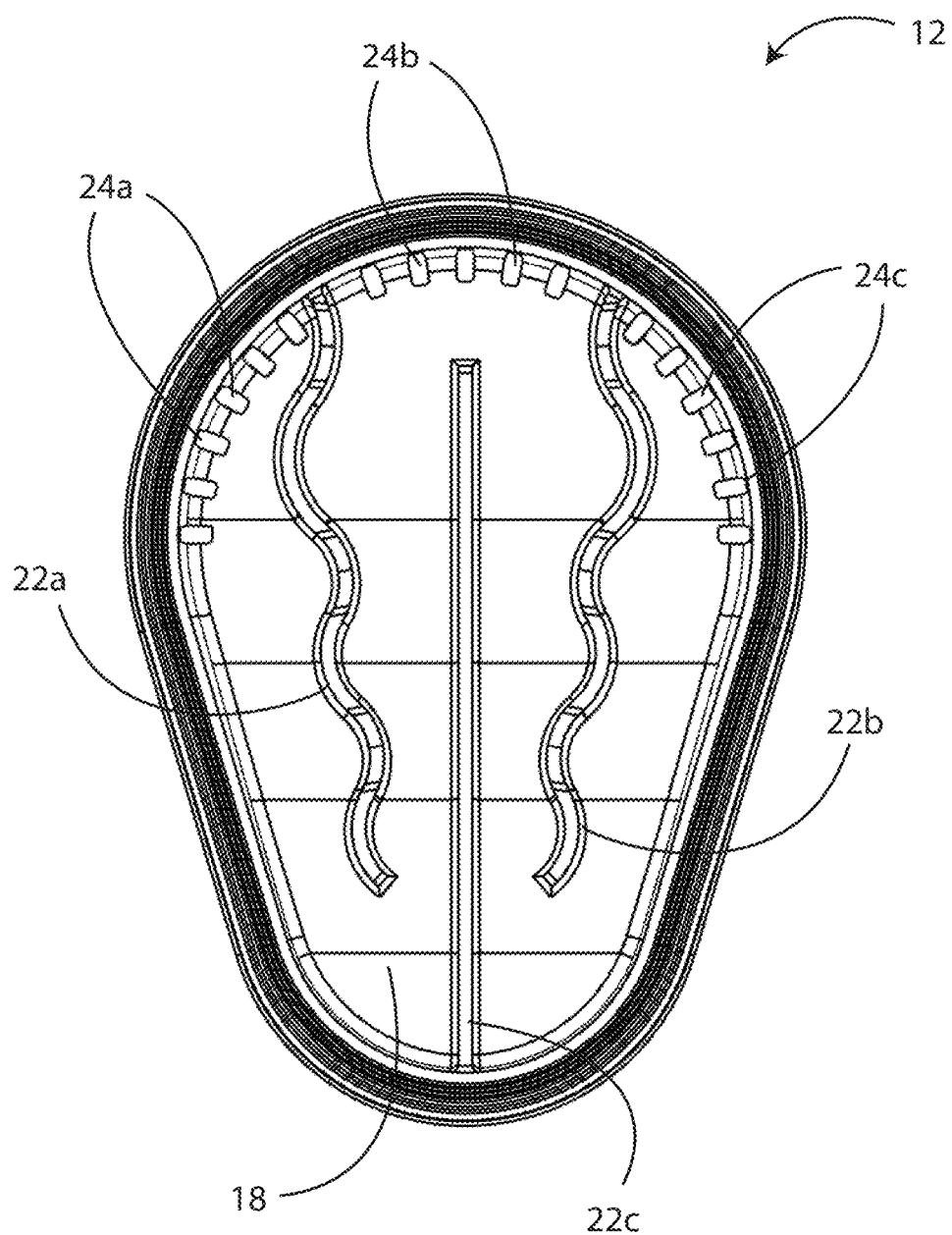
FIG. 6 is a bottom view of the cover shown in FIG. 5.

As seen in FIGS. 5-6, the cover 12 has a top surface 18, a cover sidewall 20, a plurality of cover support elements 22, and a plurality of inhalation vents 24. The cover may have three support elements 22, each of which extend downwardly from an internal face of the top surface 18. A first cover support element (identified as 22c) forms a straight line. The first cover support element 22c extends from a portion of the cover sidewall 20 located in the front region 9 and extends rearwardly. A pair of cover support elements (identified as 22a and 22b) each have a serpentine shape and a plurality of valley regions 25. The second and third cover support elements 22a, 22b extend from portions of the cover sidewall 20 located in the rear region 13 and extend forwardly. A portion of the first cover support element 22c is located between the second and third cover support elements 22a, 22b. In the embodiment shown in FIG. 6, straight cover support element 22c extends from a central portion of the front region 9 and serpentine cover support elements 22a, 22b each extend from the rear region, one either side of the straight cover support element 22c. Each of the serpentine cover support elements 22a, 22b is equidistant from the straight cover support element 22c, such that the serpentine support elements 22a, 22b are symmetrically distributed along the cover sidewall 20 with respect to the straight cover support element 22c.

The inhalation vents 24 are located in a rear region 13 of the cover 12. In the embodiment shown in FIG. 6, the inhalation vents 24 are located primarily in the cover sidewall 20 and are arranged in a first set 24a, a second set 24b, and a third set 24c. The first set 24a is located outward of the first cover support element 22a, the second set 24b is located between the first and second cover support elements 22a, 22b, and the third set 24c is located outward of the second cover support element 22b. More specifically, in this embodiment, the second set 24b is located in a central portion of the rear region 13 between the serpentine support elements 22a, 22b and aligned with the straight cover support element 22c, while the first set 24a is positioned along the cover sidewall on the opposite side of the serpentine cover support element 22a. Similarly, the third set 24c is positioned on the opposite side of the serpentine support element 22b. Thus, each of the serpentine cover support elements 22a, 22b is equidistant from the straight cover support element 22c, such that the inhalation vents 24 are symmetrically distributed along the cover sidewall 20 with respect to the straight cover support element 22c.

Figure 12:
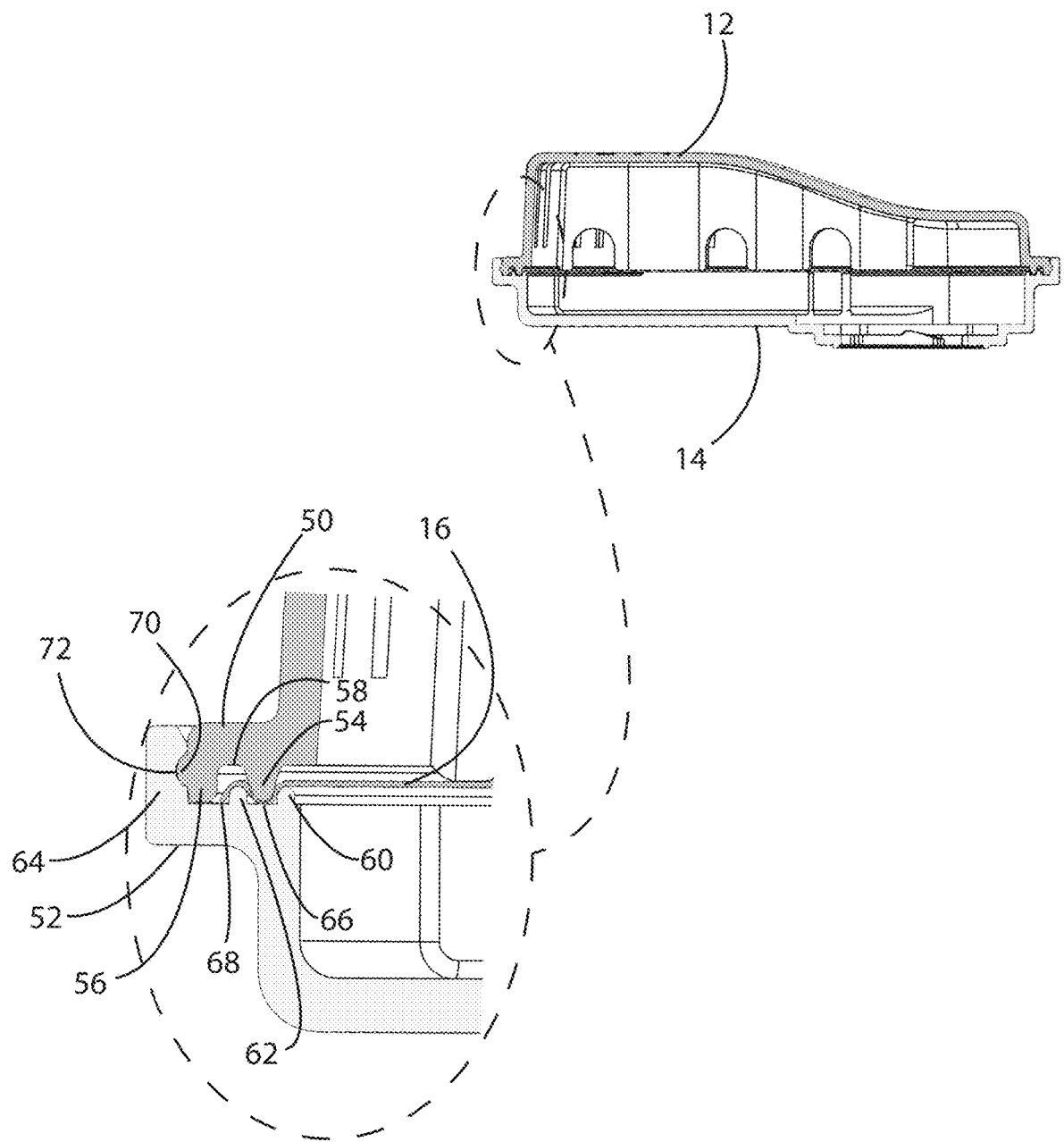
FIG. 12 is a magnified image of a cover ridge component and a base ridge component.

Details of generally vertical inhalation vents can also be seen in FIG. 4, extending from a top surface of the cover, through a sidewall of the cover toward a ridge on the cover, without extending into this ridge. Cover sidewall 20 is specifically illustrated in FIG. 5 while cover ridge component 50 is specifically illustrated in FIG. 12.

Figure 7:
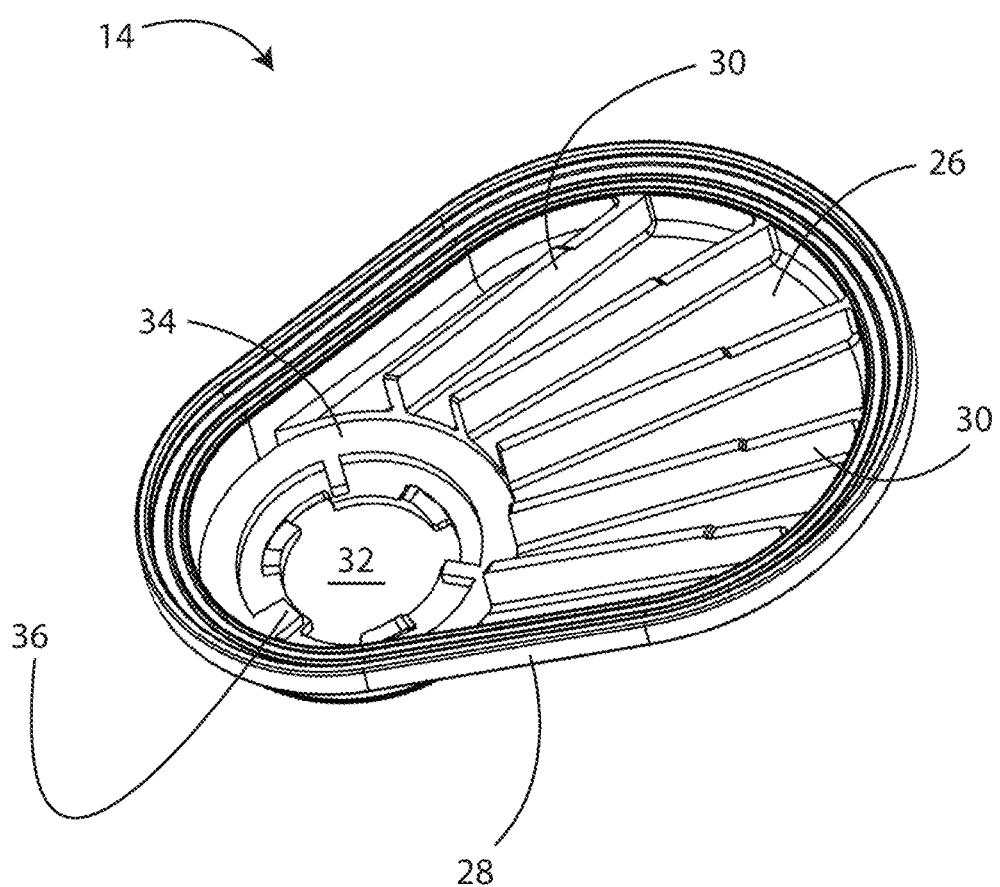
FIG. 7 is a top perspective view of a base of the filter cartridge shown in FIGS. 2A-2B, FIG. 3, and FIG. 4.

The base 14 has a bottom surface 26, a base sidewall 28, a plurality of base support elements 30, an inhalation port 32, and a recessed region 34 surrounding the inhalation port. As seen in FIG. 7, the plurality of base support elements 30 extend upwardly from an internal face of the bottom surface 26. The base support elements 30 extend from portions of the base sidewall 28 located in the rear region 13 and extend forwardly to the recessed region 34. The inhalation port 32 passes through the bottom surface 26 and is located in the front region 9 of the base 14. The inhalation port 32 comprises a connector 36 configured to mate with a connector on a facepiece respirator mask body. In one embodiment, the connector 36 is, for example, a bayonet connector.

When the filter cartridge 10 is connected to the facepiece respirator mask body 8, the rear region 13 of the filter cartridge is posterior to the front region 9. Accordingly, the inhalation vents 24, which are located in the rear region 13 of the cover 12, are positioned in a manner that helps prevent particulates (e.g., biological debris) from easily entering into the filter cartridge 10, potentially extending the overall lifetime of the filter medium 16. As seen in FIGS. 3, 4, 8, 9, 10A, and 10B, the orientation of the inhalation vents 24 inhalation is generally vertical, in a direction perpendicular to the filter medium 16, which is sandwiched between the base support elements 30 and the cover support elements 22.

Figure 8:
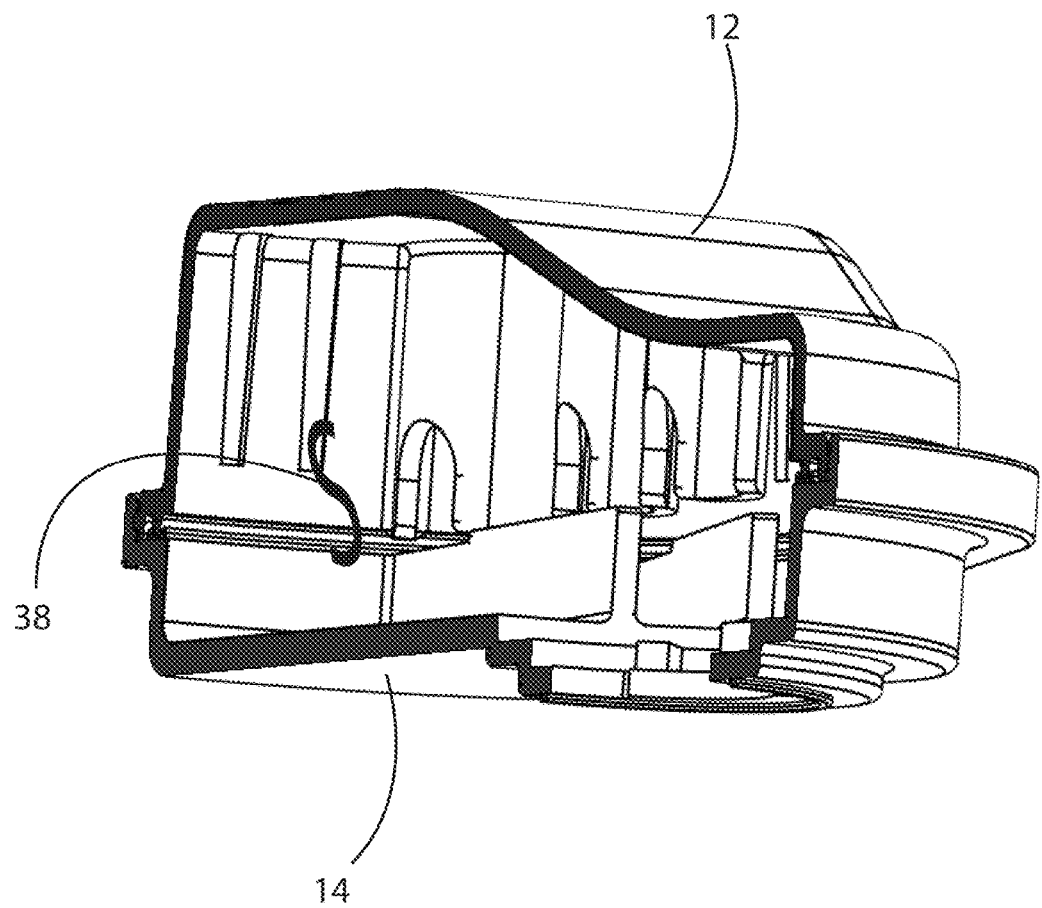
FIG. 8 is a longitudinal cross-sectional view of the filter cartridge shown in FIGS. 2A-2B, FIG. 3, and FIG. 4, a filter medium of the filter cartridge having been removed for clarity purposes.
Figure 9:
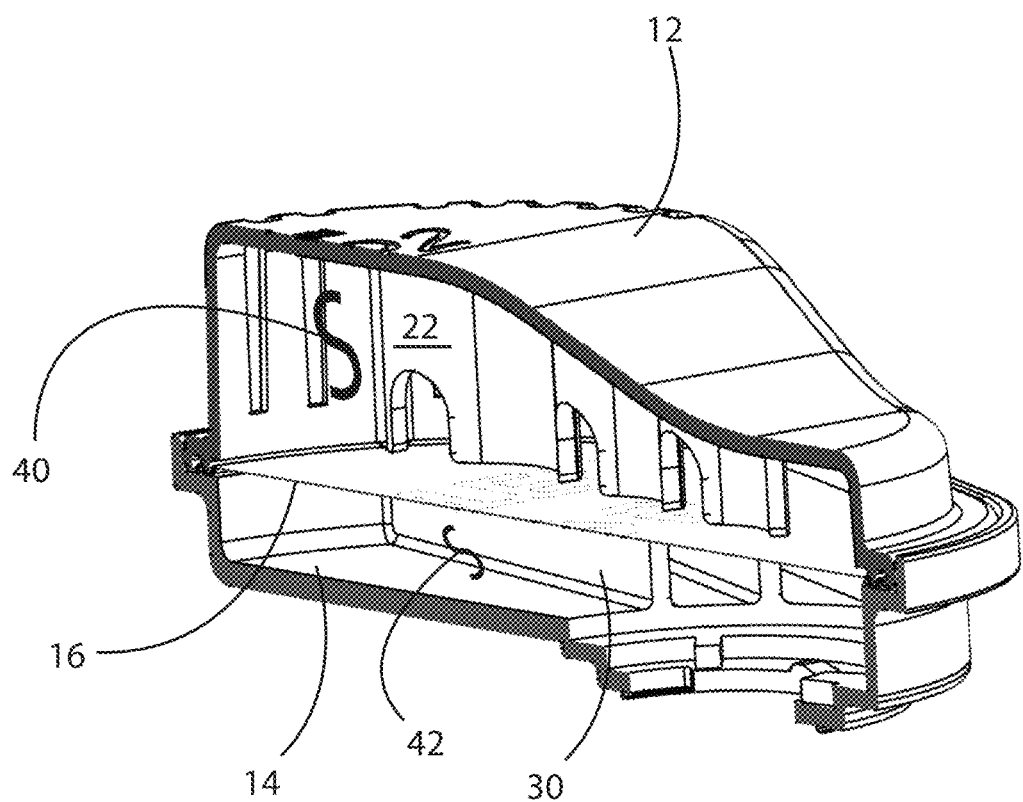
FIG. 9 is a longitudinal cross-sectional view of the filter cartridge shown in FIGS. 2A-2B, FIG. 3, and FIG. 4.
Figure 10A:
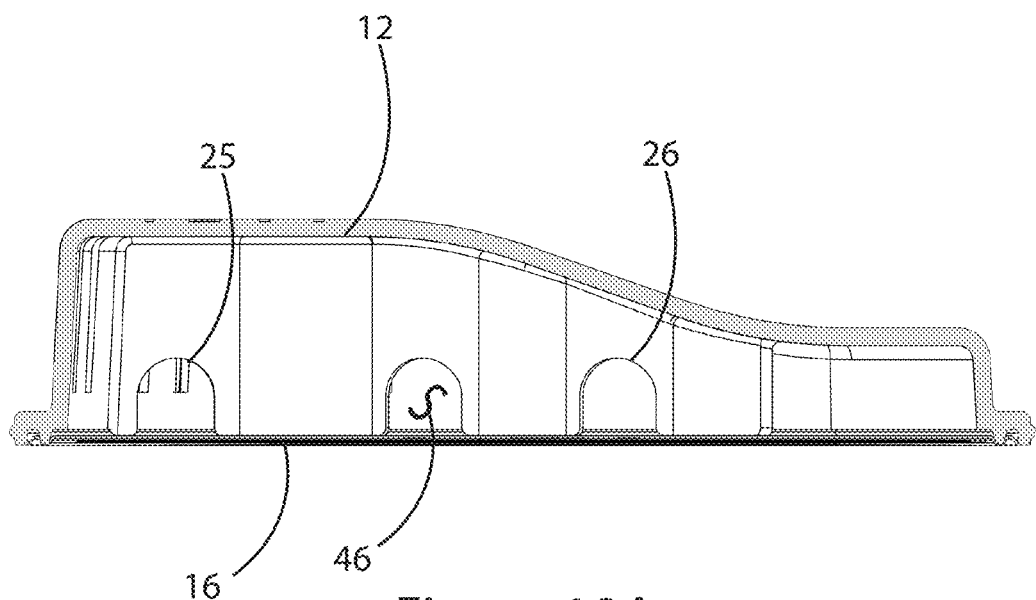
FIG. 10A is a longitudinal cross-sectional view of the cover of the filter cartridge and the filter medium.
Figure 10B:
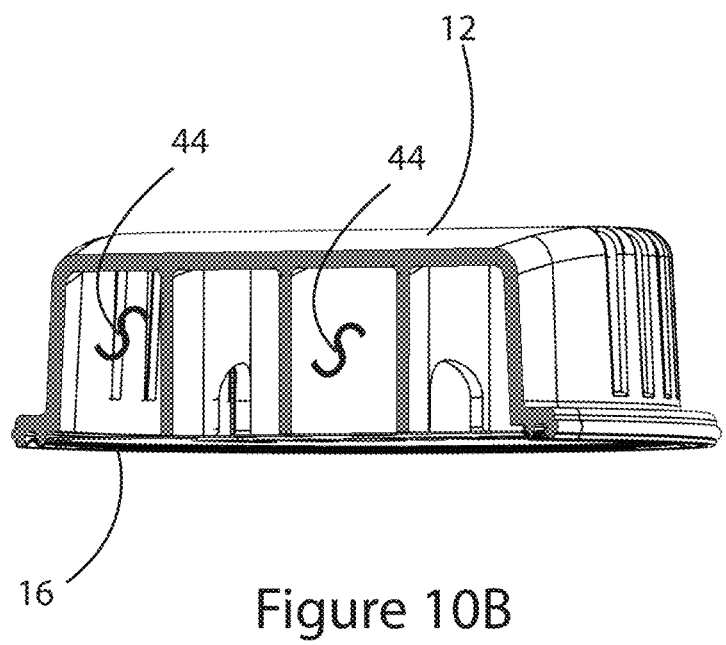
FIG. 10B is a horizontal cross-sectional view of the cover of the filter cartridge and the filter medium.

As seen in FIG. 8, the cover 12 and the base 14 collectively define an interior compartment 38. The filter medium 16 is located within the interior compartment 38, which can be seen in FIG. 9. More specifically, the filter medium 16 is sandwiched between the cover support elements 22 and the base support elements 30 in a manner that divides the interior compartment 38 in an upper chamber 40 and a lower chamber 42. As seen in FIGS. 9 and 10A-10B, the cover support elements 22 and the filter medium 16 collectively define a plurality of longitudinal airflow channels 44 in the upper chamber 40 of the interior compartment 38. The valley regions 25 of the serpentine cover support elements 22a and 22b also create a plurality of horizontal airflow channels 46 in the upper chamber 40 of the interior compartment 38. The longitudinal and horizontal airflow channels 44, 46 enable ambient air to be distributed within the upper chamber 40.

Figure 11A:
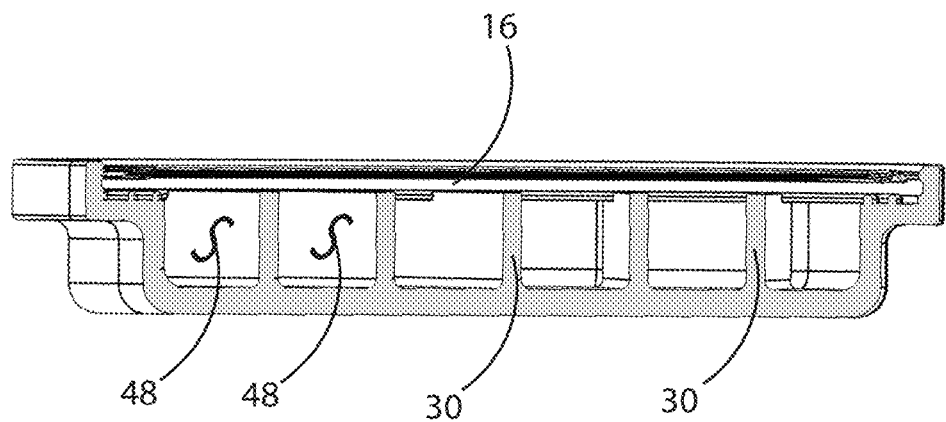
FIG. 11A is a horizontal cross-sectional view of the base of the filter cartridge and the filter medium.
Figure 11B:
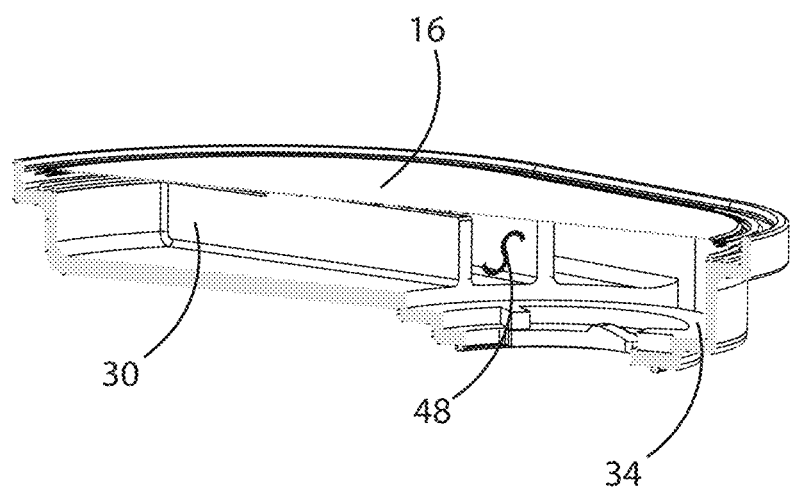
FIG. 11B is a longitudinal cross-sectional view of the base of the filter cartridge and the filter medium.

As seen in FIGS. 9 and 11A-11B, the base support elements 30 and the filter medium 16 define a plurality of longitudinal airflow channels 48 in the lower chamber 42 of the interior compartment 38. The longitudinal airflow channels 48 funnel filtered air in the lower chamber 42 to the recessed region 34 so that the air can be subsequently discharged from the filter cartridge 10 through the inhalation port 32.

Ambient air is drawn into the filter cartridge 10 by a negative pressure generated by inhalation from a person wearing the facepiece respirator. The ambient air enters into the upper chamber 40 through the inhalation vents 24. The serpentine cover support elements 22a and 22b act as turbulence generating features that, in combination with support element 22c and the longitudinal and horizontal airflow channels 44, 46, help to evenly distribute the ambient air across the entirety of an upper surface of the filter medium 16. The ambient air passes through the filter medium and into the lower chamber 42. The base support elements 30 funnel, via the longitudinal airflow channels 48, the filtered air towards the recessed region 34 so that the air can be subsequently discharged from the filter cartridge 10 through the inhalation port 32. The filtered air exits the filter cartridge 10 and enters the interior of the facepiece respirator mask body 8.

The cover 12 and the base 14 are designed to form a snap-fit connection, thereby increasing the speed of assembly of the filter cartridge 10 and enabling the filter medium 16 to be replaced. To facilitate this snap-fit connection, the cover sidewall 20 comprises a cover ridge component 50 and the base sidewall 28 comprises a base ridge component 52. The cover ridge component 50 includes an internal cover perimeter wall 54 and an external cover perimeter wall 56. The internal cover perimeter wall 54 is spaced from the external cover perimeter wall 56 to form an upper perimeter groove 58. The base ridge component 52 includes a first internal base perimeter wall 60, a second internal base perimeter wall 62, and an external base perimeter wall 64. The first internal base perimeter wall 60 is spaced from the second internal base perimeter wall 62 to form an inner lower perimeter groove 66, and the second internal base perimeter wall 62 is spaced from the external base perimeter wall 64 to form an outer lower perimeter groove 68. An outer surface of the external cover perimeter wall 56 includes an apex 70 and an inner surface of the external base perimeter wall 64 comprises a ridge 72.

The cover ridge component 50 snaps together with the base ridge component 52 in a manner such that the internal cover perimeter wall 54 pinches a portion of the filter medium 16 into the inner lower perimeter groove 66. The outer cover perimeter wall 56 press fits into the outer lower perimeter groove 68, with the apex 70 matingly engaging the ridge 72 to form a snap-fit connection.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

Further, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

What is claimed is:

1. A filter cartridge for a facepiece respirator mask body, the filter cartridge comprising:
   a cover having a top surface, a cover sidewall, a plurality of cover support elements, and an inhalation vent, the cover support elements extending downwardly from the top surface, the inhalation vent being located primarily in the cover sidewall;
   a base having a bottom surface, a base sidewall, a plurality of base support elements, and an inhalation port, the base support elements extending upwardly from the bottom surface, the inhalation port extending through the bottom surface; and
   a filter medium;
   wherein the base and the cover collectively define an interior compartment, the filter medium being sandwiched between the base support elements and the cover support elements in a manner that divides the interior compartment into an upper chamber and a lower chamber, the filter cartridge being configured such that ambient air entering into the upper chamber via the inhalation vent passes through the filter medium and into the lower chamber before exiting the interior compartment through the inhalation port,
   wherein the cover comprises a plurality of inhalation vents, each of the inhalation vents being located at least primarily in the cover sidewall,
   the plurality of cover support elements including a first cover support element and a second cover support element, the plurality of inhalation vents including a first set, a second set, and a third set, the first set located outward of the first cover support element, the third set located outward of the second support element, and the second set located between the first and the third sets.

2. The filter cartridge of claim 1, the inhalation vent having an orientation that is generally perpendicular to the filter medium.

3. The filter cartridge of claim 1, wherein the filter cartridge comprises a front region and a rear region, the plurality of inhalation vents being located in the rear region of the filter cartridge.

4. The filter cartridge of claim 1, wherein the plurality of cover support elements and the filter medium collectively define a plurality of longitudinal airflow channels in the upper chamber of the interior compartment.

5. The filter cartridge of claim 4, wherein at least one of the plurality of cover support elements has a serpentine shape.

6. The filter cartridge of claim 4, wherein at least one of the plurality of cover support elements has a valley region, the valley region forming a horizontal airflow channel between two of the longitudinal airflow channels.

7. The filter cartridge of claim 4, wherein the plurality of base support elements and the filter medium collectively define a plurality of longitudinal airflow channels in the lower chamber of the interior compartment.

8. The filter cartridge of claim 1, wherein the cover sidewall has a cover ridge component and the base sidewall has a base ridge component, the cover ridge component is configured to mate and engage with the base ridge component to form a snap-fit connection.

9. The filter cartridge of claim 8, the inhalation vent extending from the top surface of the cover toward the cover ridge component in a direction that is generally perpendicular to the filter medium.

10. The filter cartridge of claim 8, wherein the inhalation vent extends from the top surface of the cover toward the cover ridge component but does not extend into the cover ridge component.

11. The filter cartridge of claim 8, wherein the cover ridge component comprises an internal cover perimeter wall and an external cover perimeter wall, the internal cover perimeter wall being spaced from the external cover perimeter wall to form an upper perimeter groove.

12. The filter cartridge of claim 11, wherein the base ridge component comprises a first internal base perimeter wall, a second internal base perimeter wall, and an external base perimeter wall, the second internal base perimeter wall being located between the first internal base perimeter wall and the external base perimeter wall, the first internal base perimeter wall being spaced from the second internal base perimeter wall to form an inner lower perimeter groove, the second internal base perimeter wall being spaced from the external base perimeter wall to form an outer lower perimeter groove.

13. The filter cartridge of claim 12, wherein the internal cover perimeter wall pinches a portion of the filter medium into the inner lower perimeter groove.

14. The filter cartridge of claim 13, wherein an outer surface of the external cover perimeter wall comprises an apex and an inner surface of the external base perimeter wall comprises a ridge, the apex is configured to mate and engage with the ridge to form a snap-fit connection.

15. A filter cartridge for a facepiece respirator mask body, the filter cartridge comprising:
 a cover having a top surface, a cover sidewall, a plurality of cover support elements, and an inhalation vent, the cover support elements extending downwardly from the top surface, the inhalation vent being located primarily in the cover sidewall;
 a base having a bottom surface, a base sidewall, a plurality of base support elements, and an inhalation port, the base support elements extending upwardly from the bottom surface, the inhalation port extending through the bottom surface; and
 a filter medium;
 wherein the base and the cover collectively define an interior compartment, the filter medium being sandwiched between the base support elements and the cover support elements in a manner that divides the interior compartment into an upper chamber and a lower chamber, the filter cartridge being configured such that ambient air entering into the upper chamber via the inhalation vent passes through the filter medium and into the lower chamber before exiting the interior compartment through the inhalation port,
 wherein the cover comprises a plurality of inhalation vents, each of the inhalation vents being located at least primarily in the cover sidewall,
 wherein the filter cartridge comprises a front region and a rear region, the plurality of inhalation vents being located in the rear region of the filter cartridge,
 the plurality of cover support elements including a pair of cover support elements, each of the pair of cover support elements extending forwardly from the rear region, the plurality of inhalation vents including a first set, a second set, and a third set, the first set located outward of a first of the pair of cover support elements, the third set located outward of a second of the pair of cover support elements, and the second set located between the first and the third sets.

16. The filter cartridge of claim 15, the inhalation vent extending from the top surface of the cover toward the base of the filter cartridge, in a direction that is generally perpendicular to the filter medium sandwiched between the base support elements and the cover support elements.

17. The filter cartridge of claim 15, the plurality of cover support elements further including a third cover support element extending rearwardly from the front region, the second set aligned with the third cover support element.

18. A filter cartridge for a facepiece respirator mask body, the filter cartridge comprising:
 a cover having a top surface, a cover sidewall, a plurality of cover support elements, and an inhalation vent, the cover support elements extending downwardly from the top surface, the inhalation vent being located primarily in the cover sidewall;
 a base having a bottom surface, a base sidewall, a plurality of base support elements, and an inhalation port, the base support elements extending upwardly from the bottom surface, the inhalation port extending through the bottom surface; and
 a filter medium;
 wherein the base and the cover collectively define an interior compartment, the filter medium being sandwiched between the base support elements and the cover support elements in a manner that divides the interior compartment into an upper chamber and a lower chamber, the filter cartridge being configured such that ambient air entering into the upper chamber via the inhalation vent passes through the filter medium and into the lower chamber before exiting the interior compartment through the inhalation port,
 wherein the cover comprises a plurality of inhalation vents, each of the inhalation vents being located at least primarily in the cover sidewall,
 wherein the filter cartridge comprises a front region and a rear region, the plurality of inhalation vents being located in the rear region of the filter cartridge,
 the plurality of cover support elements including a generally straight cover support element extending rearwardly from the front region and a pair of serpentine support elements each extending forwardly from the rear region, each of the serpentine cover support elements equidistant from the straight cover support element, and the plurality of inhalation vents symmetrically distributed along the cover sidewall with respect to the straight cover support element.

* * * * *